US010984160B1

(12) United States Patent
Schmidt et al.

(10) Patent No.: US 10,984,160 B1
(45) Date of Patent: Apr. 20, 2021

(54) ANALYSIS AND MODIFICATION OF CIRCUIT DESIGNS

(71) Applicant: International Business Machines Corporation, Armonk, NY (US)

(72) Inventors: Martin Bernhard Schmidt, Stuttgart (DE); Alexander Fritsch, Esslingen (DE); Werner Juchmes, Boeblingen (DE); Simon Brandl, Stuttgart (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/868,638

(22) Filed: May 7, 2020

(51) Int. Cl.
*G06F 30/3308* (2020.01)
*G06F 119/06* (2020.01)

(52) U.S. Cl.
CPC ...... *G06F 30/3308* (2020.01); *G06F 2119/06* (2020.01)

(58) Field of Classification Search
CPC ............... G06F 11/261; G06F 2119/06; G06F 30/3308; G06F 30/367; G06F 30/38; G06F 30/323; G06F 30/327; G06F 30/3312; G06F 2219/12
USPC ............ 716/106, 102–103, 108–109; 303/14
See application file for complete search history.

(56) References Cited

U.S. PATENT DOCUMENTS

| | | | |
|---|---|---|---|
| 9,183,332 B2 | 11/2015 | Ferguson | |
| 9,727,676 B1 | 8/2017 | Saurabh | |
| 10,268,787 B2 | 4/2019 | Dai | |
| 10,540,464 B1 | 1/2020 | Desai | |
| 2002/0049576 A1* | 4/2002 | Meyer | G06F 30/367 703/14 |
| 2004/0078175 A1* | 4/2004 | Shaw | G06F 11/261 703/14 |

OTHER PUBLICATIONS

"Critical path method", Wikipedia, this page last edited Mar. 3 2020, 4 pages, <https://en.wikipedia.org/wiki/Critical_path_method>.
"Static timing analysis", Wikipedia, this page last edited on Oct. 21 2019, 3 pages, <https://en.wikipedia.org/wiki/Static_timing_analysis>.
Kirkpatrick et al., "PERT as an Aid to Logic Design", IBM Journal of Research and Development, Mar. 1966, pp. 135-141, <https://ieeexplore.ieee.org/document/5392062>.
Mell et al., "The NIST Definition of Cloud Computing", Recommendations of the National Institute of Standards and Technology, Special Publication 800-145, Sep. 2011, 7 pages.

* cited by examiner

*Primary Examiner* — Paul Dinh
(74) *Attorney, Agent, or Firm* — David K. Mattheis; William H. Hartwell; Nicholas L. Cadmus

(57) ABSTRACT

Circuit analysis and modification by receiving a first description of a circuit, the first description having a first level of detail, receiving a second description of the circuit, the second description having a second level of detail, performing a circuit simulation according to the first description, identifying an active node of the first description according to the simulation, and modifying the second description according to the active node.

20 Claims, 5 Drawing Sheets

ANALYSIS AND MODIFICATION OF CIRCUIT DESIGNS

BACKGROUND

The disclosure relates generally to analyzing and modifying electronic circuit designs. The disclosure relates particularly to analyzing and modifying circuit designs according to circuit path timing.

Large scale integrated circuit device designs include billions of individual transistor elements.

Integrated circuit designs include varying levels of design details. At a low level, a design includes the device logic details describing the device functionality with equations. At a next level, the logic details have been synthesized and mapped to gates resulting in a Register Transfer Level (RTL). The RTL model of the device includes coarse circuit timing details. Simulation of circuit delays includes consideration of table-based data for the gates including the input loading of each gate, the intrinsic delay of the gate circuit and the driver strength associated with the gate.

At the next design level, transistors replace the gates. Simulations utilize transistor models to analyze the circuits. The design netlist—a description of the circuit element connectivity of the device—includes only transistors and functionally necessary components of the device—power converter capacitance elements, etc. The transistor level may include analog circuits of the device. In some instances, references to the transistor level design utilize the term schematic netlist for the level.

The translation of the transistor level design to actual Complementary Metal-Oxide-Semiconductor (CMOS) technology design level—the layout netlist—adds numerous parasitic resistances, capacitances, and inductances to the device design. The layout netlist includes transistors and the parasitic device elements. The layout netlist includes 100× to 1000× or more design elements in comparison to the schematic netlist.

SUMMARY

The following presents a summary to provide a basic understanding of one or more embodiments of the disclosure. This summary is not intended to identify key or critical elements or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatuses and/or computer program products simplifying the analysis and modification of electronic circuit designs according to circuit path timing analysis.

Aspects of the invention disclose methods, systems and computer readable media associated with circuit analysis and modification by receiving a first description of a circuit, the first description having a first level of detail, receiving a second description of the circuit, the second description having a second level of detail, performing a circuit simulation according to the first description, identifying an active node of the first description according to the simulation, and modifying the second description according to the active node.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
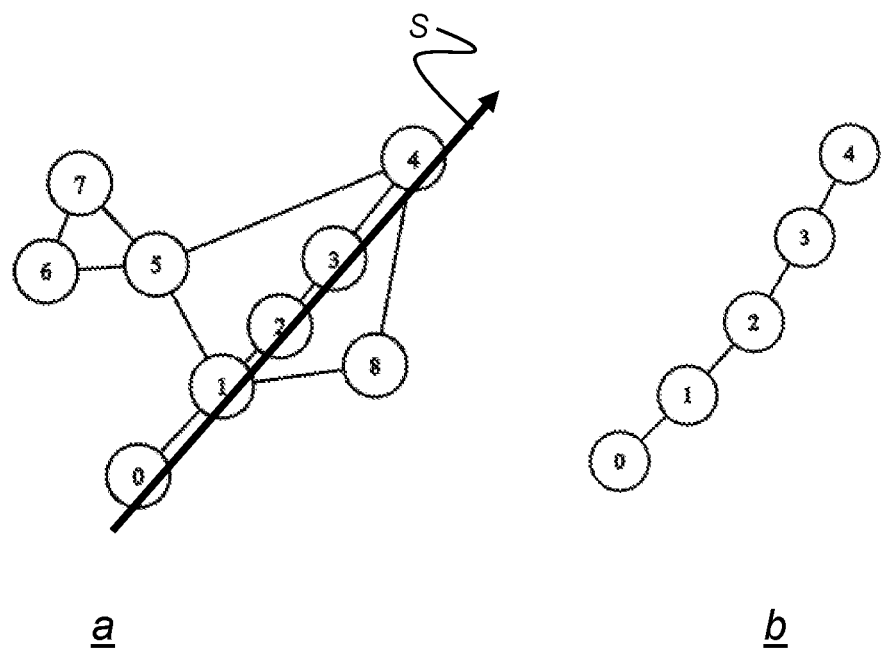
FIG. 1 provides a schematic illustration of circuit analysis simplification, according to an embodiment of the invention.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

In an embodiment, one or more components of the system can employ hardware and/or software to solve problems that are highly technical in nature (e.g., receiving initial circuit design versions, each version having a distinct level of circuit detail, simulating circuit performance according to a first initial circuit design version, identifying a critical circuit element of the first initial design version according to the simulation, modifying a second initial design version according to the critical circuit element, etc.). These solutions are not abstract and cannot be performed as a set of mental acts by a human due to the processing capabilities needed to facilitate circuit design analysis, for example. Further, some of the processes performed may be performed by a specialized computer for carrying out defined tasks related to memory operations. For example, a specialized computer can be employed to carry out tasks related to modifying high level circuit designs according to circuit path timing analysis of low-level circuit designs, or the like.

Simulation and analysis of semiconductor device designs prior to the beginning of fabrication processes may lack accuracy due to simulation set-up compromises, or may require extensive amounts of time, design effort and computing resources to accomplish as the device design may include billions of circuit elements. Proceeding to fabrication without simulation and analysis of the designs carries high risks of design failure and wasted resources. The disclosed methods and systems enable the efficient analysis and modification of device designs by streamlining the analysis at the layout level to include only relevant circuit elements.

Aspects of the invention disclose methods, systems and computer readable media associated with circuit analysis and modification by receiving a first description of a circuit, the first description having a first level of detail, receiving a second description of a circuit, the second description having a second level of detail, wherein the second level of detail includes more details than the first level of detail, performing a circuit simulation according to the first description, identifying an active node of the first description according to the simulation, modifying the second description according to the active node, simulating circuit performance using the modified second description, and saving simulated circuit waveforms associated with second description nodes.

Aspects of the invention disclose methods, systems and computer readable media associated with circuit analysis and modification by receiving a first description of a circuit, the first description having a first level of detail, receiving a second description of a circuit, the second description having a second level of detail, wherein the second level of detail includes more details than the first level of detail, performing a circuit simulation according to the first description, identifying an active node of the first description according to the simulation, modifying the second description according to the active node, simulating circuit performance using the modified second description, saving simulated circuit waveforms associated with second description nodes, analyzing the saved second description node waveforms, and modifying the second description according to the waveform analysis.

Aspects of the invention disclose methods, systems and computer readable media associated with circuit analysis and modification by receiving a first description of a circuit, the first description including a schematic netlist, receiving a second description of a circuit, the second description including a circuit layout netlist, wherein the second level of detail includes more details than the first level of detail, performing a circuit simulation according to the first description, identifying an active node of the first description according to the simulation, modifying the second description according to the active node, simulating circuit performance using the modified second description, saving simulated circuit waveforms associated with second description nodes, analyzing the saved second description node waveforms, and modifying the second description according to the waveform analysis.

Aspects of the invention disclose methods, systems and computer readable media associated with circuit analysis and modification by receiving a first description of a circuit, the first description including a schematic netlist, receiving a second description of a circuit, the second description including a circuit layout netlist, and circuit node names, wherein the second level of detail includes more details than the first level of detail, performing a circuit simulation according to the first description, identifying an active node of the first description according to the simulation, modifying the second description according to the active node, simulating circuit performance using the modifies second description, saving simulated circuit waveforms associated with second description nodes, analyzing the saved second description node waveforms, and modifying the second description according to the waveform analysis.

In an embodiment, a semiconductor device design process includes the preparation of a schematic level design including a low level of circuit element connectivity detail, as well as a layout level design including additional circuit elements. The device schematic and layout designs are prepared using device design software products. Simulations utilizing the schematic design reflect only the effects of those elements present in the design. Simulations utilizing the layout design reflect the effects of the more extensive circuit element details and require significant computing resources and time to complete. Large data sets of simulation output waveforms limit simulation capacity in terms of required storage space and system bandwidth to concurrently generate the large waveforms. Device design approvals require comparative analysis of concurrent waveforms for circuit processing timing verification.

In an embodiment, disclosed methods simulate a circuit worst-case scenario using an initial schematic design level. In an embodiment, the worst-case simulation scenario includes all timing critical operations of a circuit. As an example, simulation scenarios include READ and or WRITE operations performed by the circuit. As another example, digital circuits designs include one or more 'race conditions' where a circuit contains an 'early path' and a 'late path' having a common destination. For this example, verification is needed that the signal from the late path arrives before the signal from the early path—the path margin. The design may attempt to make the early path artificially slow and the late path artificially fast to increase the margin of the circuit. Verification of the desired path timing when the early path includes fast devices and the late path includes slow devices constitutes a worst-case scenario for the circuit. Analog circuits may also include race conditions such as an operational amplifier having too long a delay along the feedback path. The disclosed methods enable a check of the design to ensure that feedback path delays do not introduce instabilities in the amplifier's performance rendering the amplifier unstable during operation due to inaccurate feedback signals.

In an embodiment, the method applies multiple simulation scenarios to each design level to simulate worst-case scenarios for different circuit portions. As an example, for SRAM array designs, the method simulates the application of two stimuli to an array. A first stimulus selects a near SRAM cell (near=the cell next to the word line decoder in y direction, and next to the bit system in x direction) and a second stimulus selects the far SRAM cell (far=the cell with the largest distance to the word line decoder in y direction, and the largest distance to the bit system in x direction).

In this embodiment, the method determines active nodes during the worst-case simulation. Digital nodes changing logical state, and analog nodes undergoing a predefined voltage transient, during the scenario are considered active nodes. In this embodiment, the method saves the active nodes and references the saved node list in evaluating the corresponding layout design level for the device. The simulation utilizes the schematic level and automatically yields a relatively small listing of active nodes and their accompanying netlist in a single simulation iteration over as few as one device clock cycle.

In an embodiment, the method identifies those nodes and associated elements in the layout level which correspond to the saved list of active nodes identified during the schematic level simulation. In this embodiment, the method conducts a path tracing simulation at the layout level for those elements identified as active during the schematic level simulation. The method completes path tracing simulation of the active nodes relatively rapidly and stores the associated simulation generated waveforms without a need for excessive amounts of data storage.

In an embodiment, the method performs a circuit simulation utilizing the schematic netlist. In this embodiment, the method simulates the application of a defined voltage to the schematic netlist and monitors the effects of the course of the simulated voltage upon the nodes of the netlist. In this embodiment, the method identifies active nodes among those of the schematic netlist as nodes having a predefined response to the application of the simulated course of voltage. In an embodiment, the method evaluates the course of voltage upon digital nodes, the method identifies digital nodes undergoing a logical state change—"0" to "1", or "1" to "0"—as active nodes. The identified active nodes are added to and saved as part of an active node list for the schematic netlist and specific simulation.

In an embodiment, the method applies the defined course of voltage to the schematic netlist and monitors the effects of the voltage upon analog nodes of the netlist. In this embodiment, the method identifies nodes which experience a voltage transient exceeding a predefined voltage threshold, as active nodes. The method adds theses identified active analog nodes to the list of active nodes for the schematic netlist and saves the updated active node list. In this embodiment, the threshold relates to either a target voltage rise, or voltage drop in response to the applied course of the voltage. In an embodiment, the method utilizes a defined threshold of ±200 mV in identifying active analog nodes. For each of the digital and analog simulation evaluations, the simulation may be as short as a single device clock cycle.

FIG. 1 illustrates the application of the method to a schematic netlist of nodes. As shown in the figure, netlist a, illustrates the original schematic netlist including nodes 0-8, and simulated signal S, applied across nodes 0-4 of the netlist. Netlist b illustrates the schematic netlist after all inactive nodes from the simulation are removed leaving only the active nodes, 0-4, identified through the simulation.

After completion of schematic netlist simulations, the method identifies all layout level netlist nodes associated with the list of active nodes identified during the schematic level simulations. The layout level netlist includes the schematic level nodes—now definitively named-as well as any parasitic capacitance, inductance and resistance elements associated with those active nodes. The method modifies the layout netlist, removing all elements not associated with an active node from schematic netlist active node list. The method retains all layout netlist nodes corresponding to the schematic netlist active nodes, as well as layout netlist nodes connected to the active nodes. In an embodiment, this removal results in a 100×-1000× reduction in the number of layout netlist nodes.

In an embodiment, the method conducts one or more simulations of the revised layout netlist nodes. The method simulated the application of a defined signal to the revised layout netlist nodes and monitors and records the waveforms simulated as a response at each revised layout netlist node to the applied signal. The saved response waveforms are analyzed as a set, or in groups of related nodes, to verify that device element response timings are correct. In an embodiment, the analysis provides a listing of timing issues together with the netlist elements giving rise to the timing issue. In this embodiment, a designer modifies the device design to resolve the circuit path timing issues revealed by the waveform analysis. The simulations of the layout level modified to remove all in active nodes applies simulated signals to both analog and digital circuit nodes and records the resulting node response waveforms. Schematic and layout level nodes which are not on the active node list, and are not connected to active nodes, are not considered during the layout netlist level of simulations of the design.

In an embodiment, the method enables the identification of schematic nodes of interest—i.e., active nodes, the identification of the corresponding layout nodes of interest by name, the simulation of an entire layout netlist while saving waveforms from layout nodes of interest, and detailed analysis of circuit path timings revealed by the saved waveforms.

In an embodiment, the active nodes stay in the layout netlist. Additionally, instances of resistors, capacitors, inductors, transistors, etc., which are connected to the active noes, as well as nodes connected to the active nodes and the connected instances, remain in the layout netlist. During the simulations, all nodes of the layout netlist are driven by an ideal direct current (dc) voltage source. As a result, all layout netlist nodes have the same dc voltage as the corresponding nodes in the full schematic netlist. In an embodiment, the method saves all "analog" node voltages of active nodes must be saved during layout netlist simulations.

Figure 2:
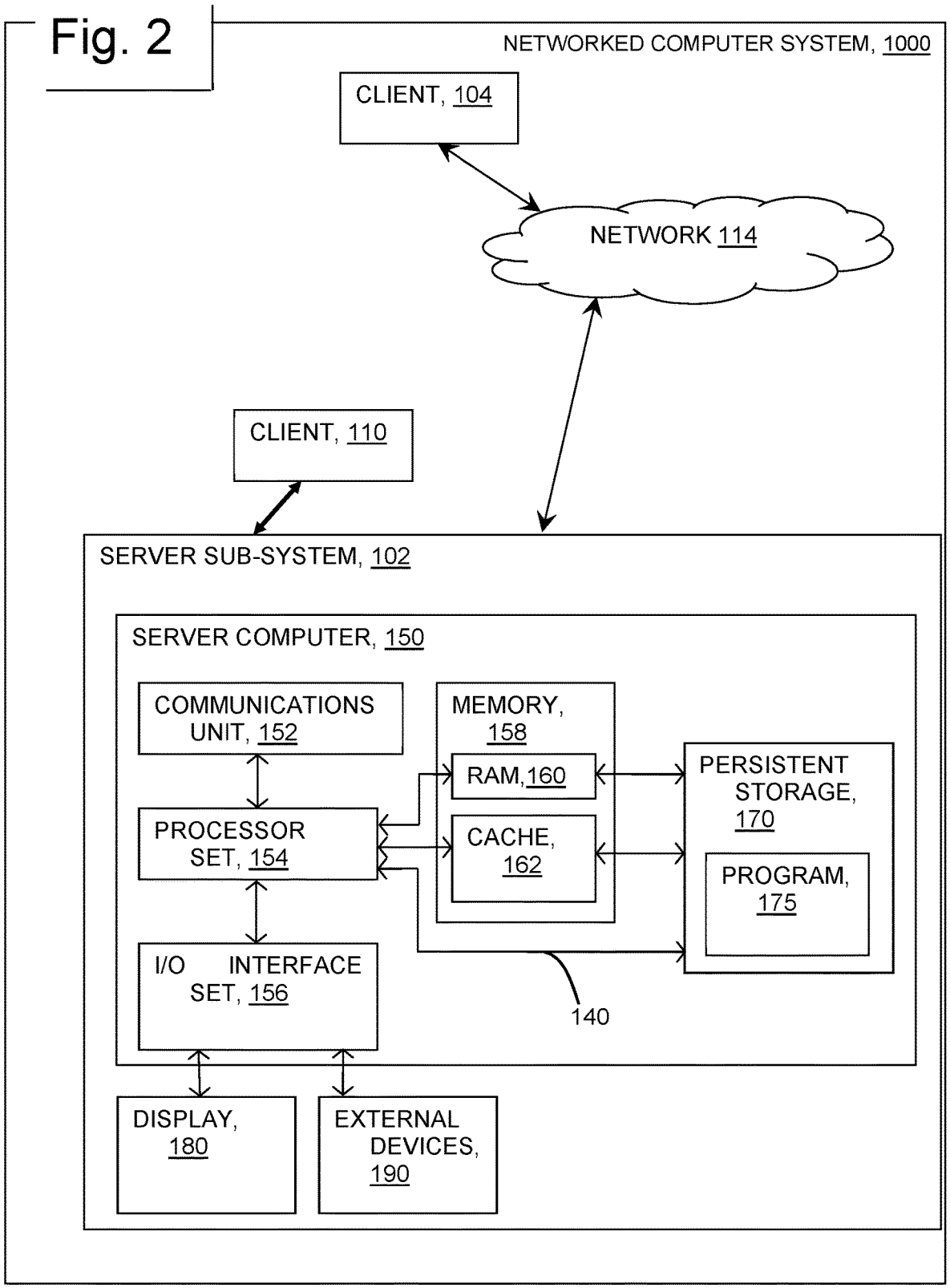
FIG. 2 provides a schematic illustration of a computing environment according to an embodiment of the invention.

FIG. 2 provides a schematic illustration of exemplary network resources associated with practicing the disclosed inventions. The inventions may be practiced in the processors of any of the disclosed elements which process an instruction stream. As shown in the figure, a networked Client device 110 connects wirelessly to server sub-system 102. Client device 104 connects wirelessly to server sub-system 102 via network 114. Client devices 104 and 110 comprise device design analysis program (not shown) together with sufficient computing resource (processor, memory, network communications hardware) to execute the program. Client devices 104 and 110 enable device designers access to more extensive computing resources—server sub-system 102 through their network access. Server sub-system 102 may exist as part of a local area network, a wide area network edge cloud resources or cloud-based resources. Accessing network resource afford device designers access to resource sufficient to analyze large device designs.

As shown in FIG. 2, server sub-system 102 comprises a server computer 150. FIG. 2 depicts a block diagram of components of server computer 150 within a networked computer system 1000, in accordance with an embodiment of the present invention. It should be appreciated that FIG. 2 provides only an illustration of one implementation and does not imply any limitations with regard to the environments in which different embodiments can be implemented. Many modifications to the depicted environment can be made.

Server computer 150 can include processor(s) 154, memory 158, persistent storage 170, communications unit 152, input/output (I/O) interface(s) 156 and communications fabric 140. Communications fabric 140 provides communications between cache 162, memory 158, persistent storage 170, communications unit 152, and input/output (I/O) interface(s) 156. Communications fabric 140 can be implemented with any architecture designed for passing data and/or control information between processors (such as microprocessors, communications and network processors, etc.), system memory, peripheral devices, and any other hardware components within a system. For example, communications fabric 140 can be implemented with one or more buses.

Memory 158 and persistent storage 170 are computer readable storage media. In this embodiment, memory 158 includes random access memory (RAM) 160. In general, memory 158 can include any suitable volatile or non-volatile computer readable storage media. Cache 162 is a fast memory that enhances the performance of processor(s) 154 by holding recently accessed data, and data near recently accessed data, from memory 158.

Program instructions and data used to practice embodiments of the present invention, e.g., the device design analysis program 175, are stored in persistent storage 170 for execution and/or access by one or more of the respective processor(s) 154 of server computer 150 via cache 162. In this embodiment, persistent storage 170 includes a magnetic hard disk drive. Alternatively, or in addition to a magnetic hard disk drive, persistent storage 170 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 170 may also be removable. For example, a removable hard drive may be used for persistent storage 170. Other examples include optical and magnetic disks, thumb drives, and smart cards that are inserted into a drive for transfer onto another computer readable storage medium that is also part of persistent storage 170. Communications unit 152, in these examples, provides for communications with other data processing systems or devices, including resources of client computing devices 104, and 110. In these examples, communications unit 152 includes one or more network interface cards. Communications unit 152 may provide communications through the use of either or both physical and wireless communications links. Software distribution programs, and other programs and data used for implementation of the present invention, may be downloaded to persistent storage 170 of server computer 150 through communications unit 152.

I/O interface(s) 156 allows for input and output of data with other devices that may be connected to server computer 150. For example, I/O interface(s) 156 may provide a connection to external device(s) 190 such as a keyboard, a keypad, a touch screen, a microphone, a digital camera, and/or some other suitable input device. External device(s) 190 can also include portable computer readable storage media such as, for example, thumb drives, portable optical or magnetic disks, and memory cards. Software and data used to practice embodiments of the present invention, device design analysis program 175 on server computer 150, can be stored on such portable computer readable storage media and can be loaded onto persistent storage 170 via I/O interface(s) 156. I/O interface(s) 156 also connect to a display 180.

Display 180 provides a mechanism to display data to a user and may be, for example, a computer monitor. Display 180 can also function as a touch screen, such as a display of a tablet computer.

Figure 3:
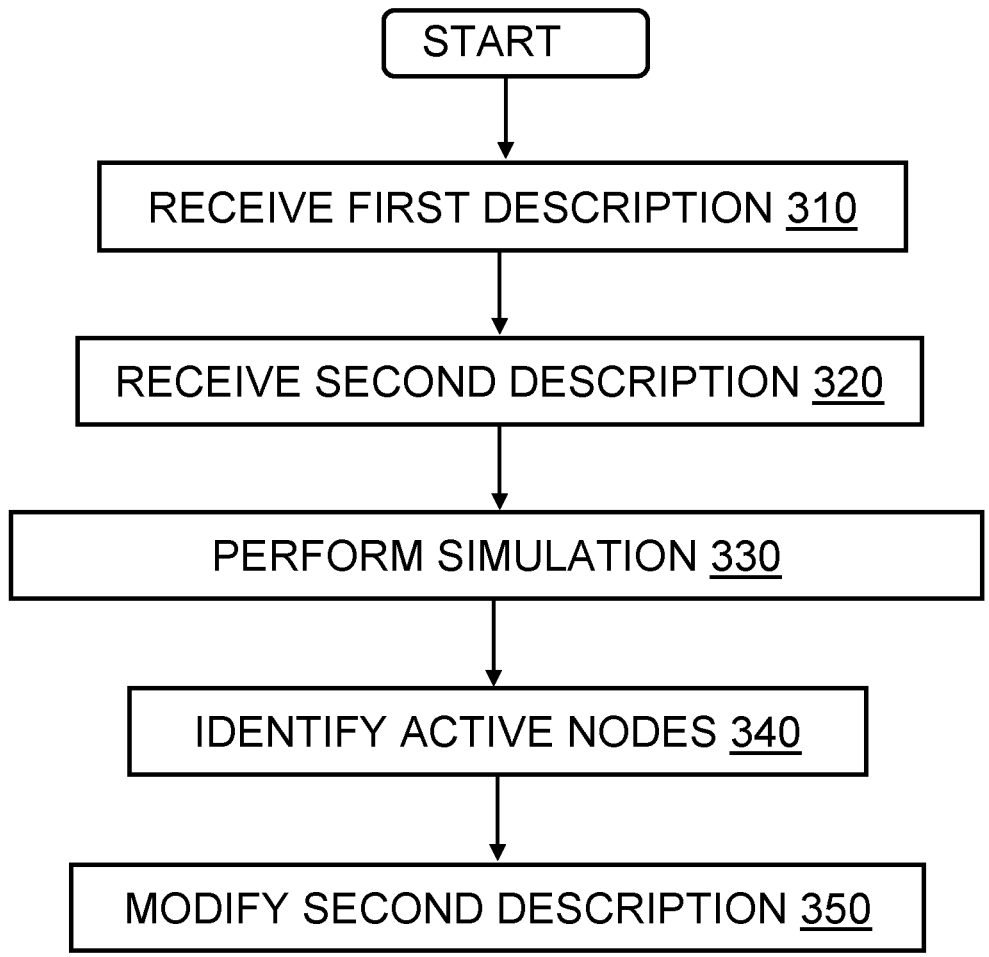
FIG. 3 provides a flowchart depicting an operational sequence, according to an embodiment of the invention.

FIG. 3 provides a flowchart 300, illustrating exemplary activities associated with the practice of the disclosure. After program start, at block 310, the method of device design analysis program 175, receives a first desorption of a device circuit. The first description includes a first level of circuit element detail. In an embodiment, the first description includes the transistor level and schematic netlist of the circuits of a device design.

At block 320, the method of device design analysis program 175 receives a second description of the circuit. The second description includes a second level of circuit element detail. In an embodiment, the second description includes the layout level and layout netlist of the circuits of a device design.

At block 330, the method performs one or more circuit path timing simulations utilizing the first description (schematic netlist) of the device design. The simulation includes the application of simulated voltages to circuit pathways. The simulated voltages are defined to represent worst-case circuit operations in terms of circuit signal processing timing, such as READ and WRITE operations for digital circuits.

At block 340, the method of device design analysis program 175 identifies one or more active nodes from the schematic netlist according to the node's response to the simulated voltage. In an embodiment, the method identifies active digital nodes according to node logic state changes during the simulation. In an embodiment, the method identifies active analog nodes as nodes experiencing a voltage transient during the simulation which exceeds a defined transient threshold.

At block 350, the method of device design analysis program 175 modifies the second description according to the identified active nodes. In an embodiment, the method saves a list of active nodes identified during the simulation. The method identifies all nodes in the second description corresponding to the active nodes, as well as nodes in the second description netlist connected to the corresponding nodes. The method then modifies the second description by removing all nodes which do not correspond to an active node or which are not connected to a node corresponding to an active node. In an embodiment, the method performs simulations upon the nodes of the schematic netlist. The method saves a list of active nodes according to the response to the simulated signals. In this embodiment, the method then identifies all layout netlist nodes corresponding to the nodes saved to the active node list. The method then identifies layout netlist nodes connected to the nodes identified as corresponding to those of the active node list. The method then modifies the layout netlist by removing all other nodes—i.e., all nodes not corresponding to active nodes and not connected to nodes corresponding to active nodes.

In an embodiment, after modifying the layout netlist, the method conducts a second round of circuit simulations upon the modified layout netlist nodes. The method applies simulated signals to the netlist nodes and records the response waveforms of the nodes. The method then conducts circuit path timing analysis using the concurrent waveform responses for the netlist nodes. In this embodiment, the method modifies the device design to eliminate circuit path timing issues identified during the waveform analysis. The modified design is then analyzed from the beginning utilizing the steps of the method set forth above. In this embodiment, the method further captures the voltages present at the active analog nodes, the connected analog nodes, or both, during the simulations.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
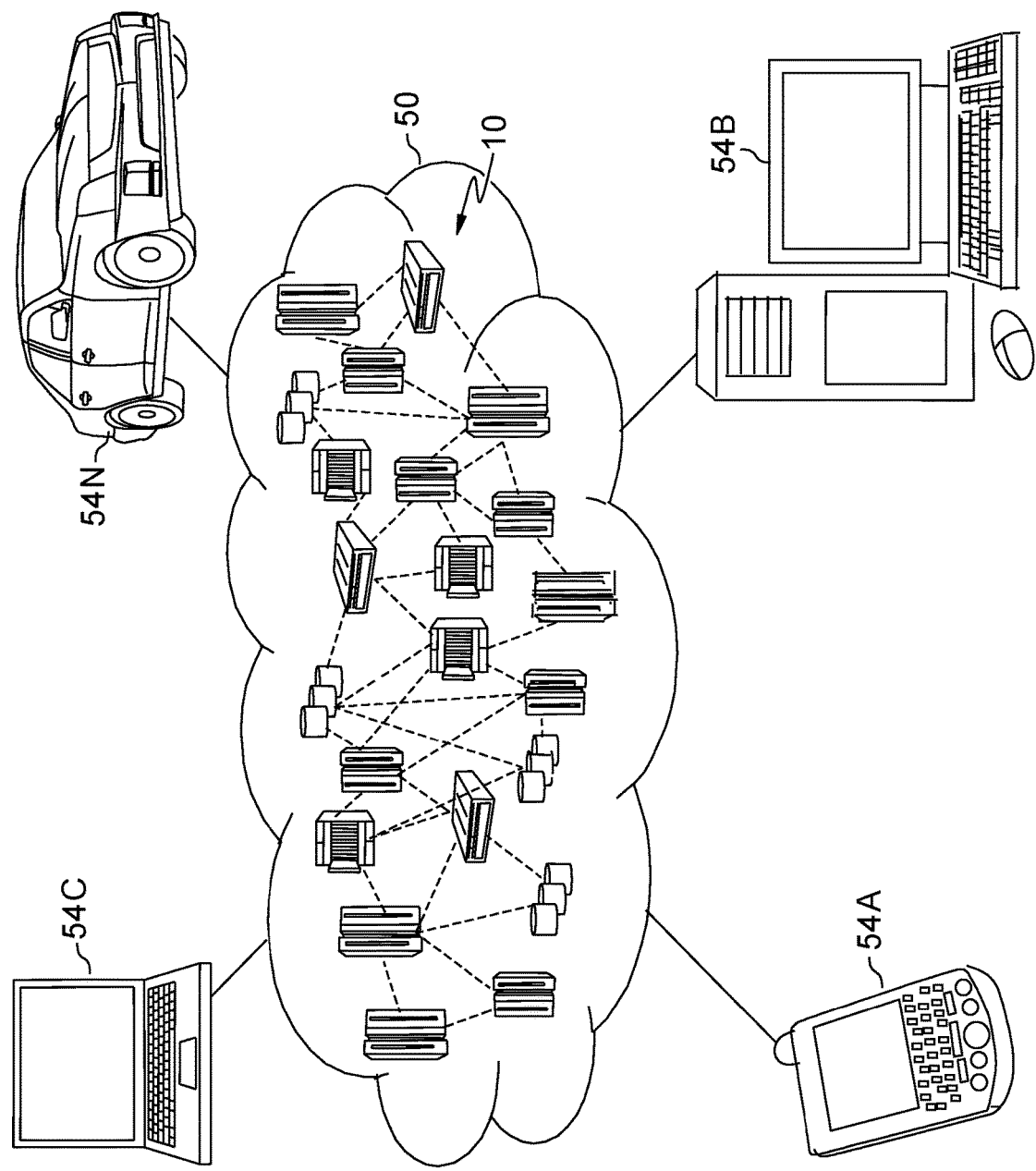
FIG. 4 depicts a cloud computing environment, according to an embodiment of the invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
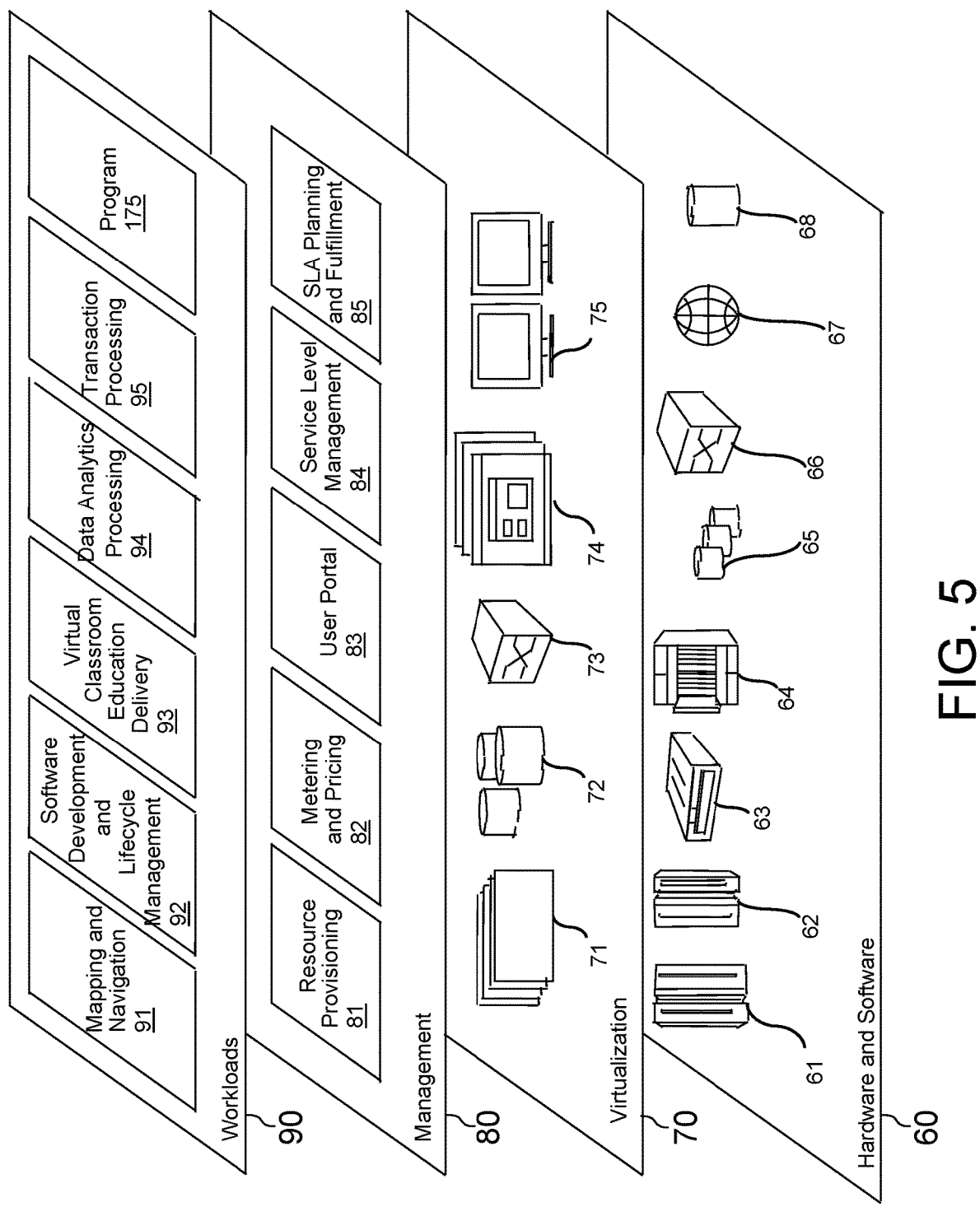
FIG. 5 depicts abstraction model layers, according to an embodiment of the invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and device design analysis program 175.

The present invention may be a system, a method, and/or a computer program product at any possible technical detail level of integration. The invention may be beneficially practiced in any system, single or parallel, which processes an instruction stream. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, and computer readable storage device, as used herein, are not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer implemented method for modifying a circuit design, the method comprising:
   receiving, by one or more computer processors, a first description of a circuit, the first description having a first level of detail;
   receiving, by the one or more computer processors, a second description of the circuit, the second description having a second level of detail;
   performing, by the one or more computer processors, a circuit simulation according to the first description;
   identifying, by the one or more computer processors, an active node of the first description according to the simulation; and
   modifying, by the one or more computer processors, the second description according to the active node.

2. The computer implemented method according to claim 1, wherein performing the circuit simulation comprises evaluating a voltage at a node during the circuit simulation.

3. The computer implemented method according to claim 2, wherein identifying the active node comprises identifying an active node according to the voltage.

4. The computer implemented method according to claim 2, further comprising detecting a digital node logical state change according to the voltage.

5. The computer implemented method according to claim 2, further comprising detecting an analog node voltage change according to the voltage.

6. The computer implemented method according to claim 1, further comprising determining a set of second description nodes according to the active node.

7. The computer implemented method according to claim 6, wherein modifying the second description comprises modifying the second description according to the set of second description nodes.

8. A computer program product for modifying a circuit design, the computer program product comprising one or more computer readable storage devices and program instructions collectively stored on the one or more computer readable storage devices, the program instructions comprising:
   program instructions to receive a first description of a circuit, the first description having a first level of detail;
   program instructions to receive a second description of the circuit, the second description having a second level of detail;
   program instructions to perform a circuit simulation according to the first description;
   program instructions to identify an active node of the first description according to the simulation; and
   program instructions to modify the second description according to the active node.

9. The computer program product according to claim 8, wherein performing the circuit simulation comprises evaluating a voltage at a node during the circuit simulation.

10. The computer program product according to claim 9, wherein identifying the active node comprises identifying an active node according to the voltage.

11. The computer program product according to claim 9, the program instructions further comprising program instructions to detect a digital node logical state change according to the voltage.

12. The computer program product according to claim 9, the program instructions further comprising program instructions to detect an analog node voltage change according to the voltage.

13. The computer program product according to claim 8, the program instructions further comprising program instructions to determine a set of second description nodes according to the active node.

14. The computer program product according to claim 13, wherein the program instructions to modify the second description comprise program instructions to modify the second description according to the set of second description nodes.

15. A computer system for modifying a circuit design, the computer system comprising:
   one or more computer processors;
   one or more computer readable storage devices; and
   program instructions stored on the one or more computer readable storage devices for execution by the one or more computer processors, the program instructions comprising:
      program instructions to receive a first description of a circuit, the first description having a first level of detail;
      program instructions to receive a second description of the circuit, the second description having a second level of detail;
      program instructions to perform a circuit simulation according to the first description;

program instructions to identify an active node of the first description according to the simulation; and program instructions to modify the second description according to the active node.

16. The computer system according to claim 15, wherein performing the circuit simulation comprises evaluating a voltage at a node during the circuit simulation.

17. The computer system according to claim 16, wherein identifying the active node comprises identifying an active node according to the voltage.

18. The computer system according to claim 16, the program instructions further comprising program instructions to detect a digital node logical state change according to the voltage.

19. The computer system according to claim 16, the program instructions further comprising program instructions to detect an analog node voltage change according to the voltage.

20. The computer system according to claim 15, the program instructions further comprising program instructions to determine a set of second description nodes according to the active node.

* * * * *